Patented Nov. 9, 1943

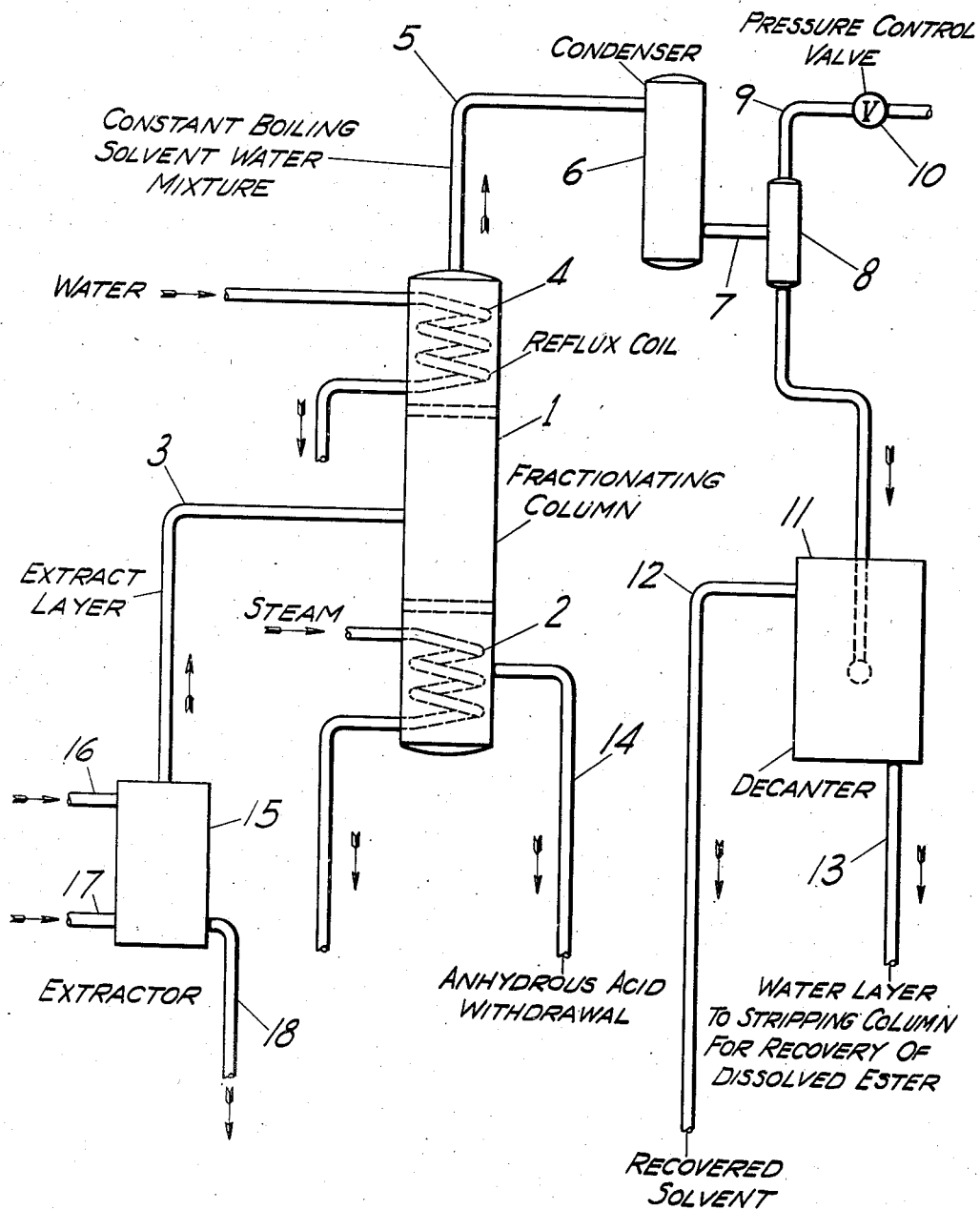

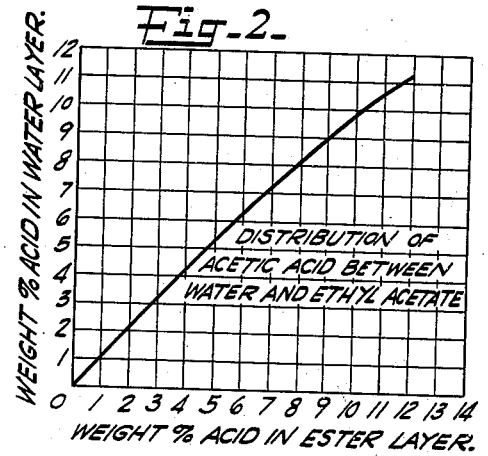
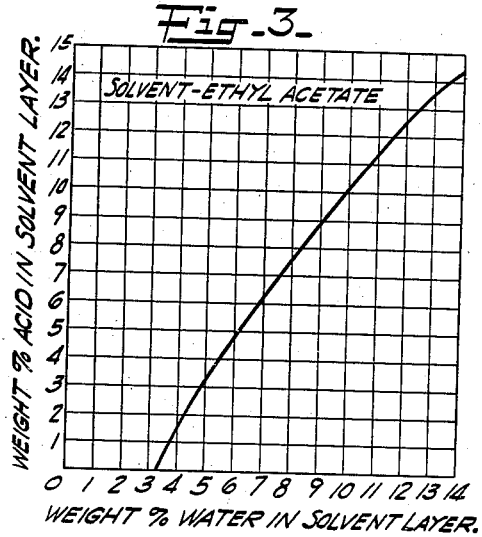
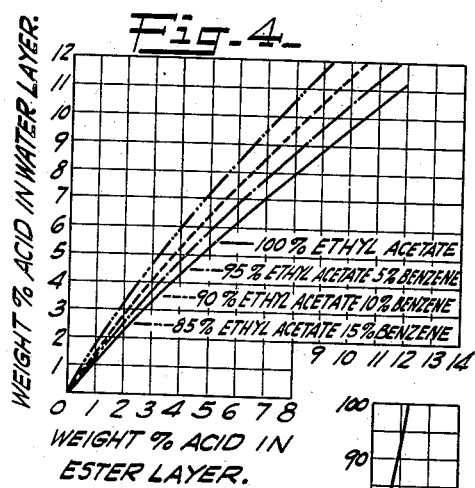
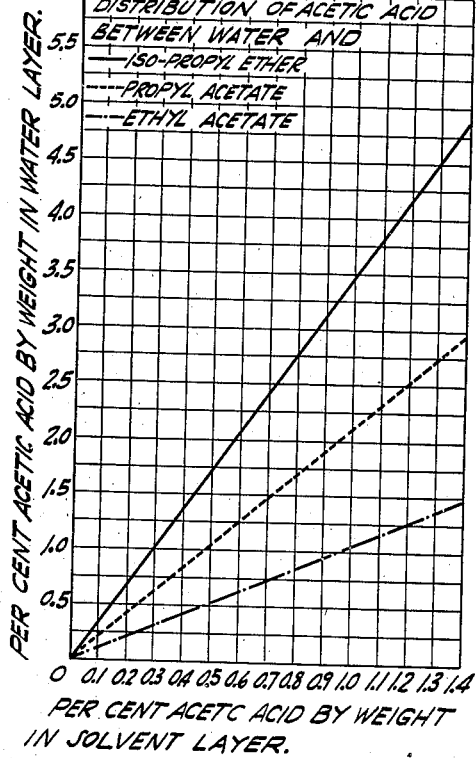
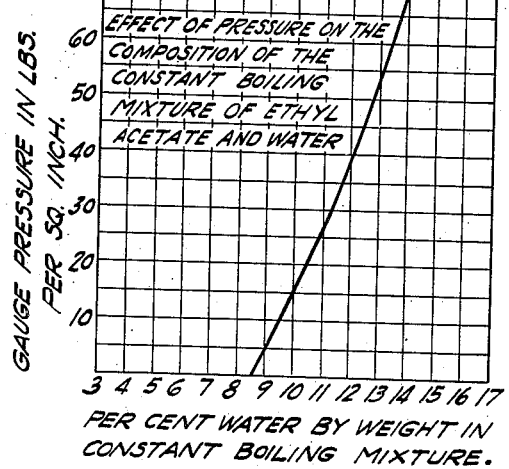

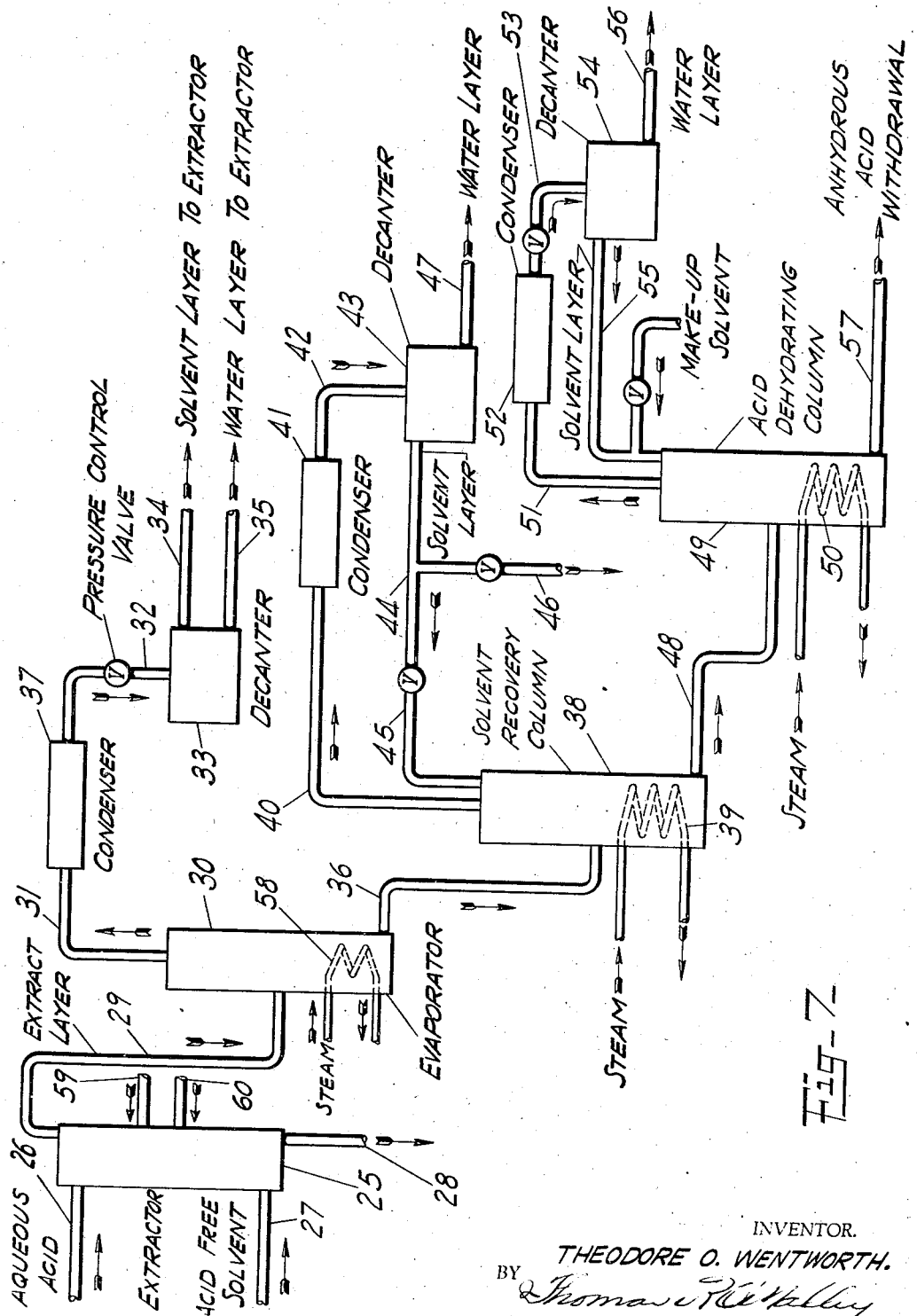

2,333,756

UNITED STATES PATENT OFFICE 2,333,756

PROCESS FOR THE RECOVERY OF LOWER ALIPHATIC ACIDS FROM AQUEOUS SOLUTIONS

Theodore O. Wentworth, Cincinnati, Ohio, assignor to The Vulcan Copper & Supply Company, Cincinnati, Ohio, a corporation of Ohio Application November 9, 1940, Serial No. 365,031

4 Claims. (Cl. 260—541)

This invention relates to improvements in processes for the concentration and recovery of lower aliphatic acids from aqueous solutions. More particularly, the invention relates to improvements in processes for recovering anhydrous lower aliphatic acids from dilute aqueous solutions.

A number of processes for concentrating and recovering lower aliphatic acids from dilute aqueous solutions have been suggested. These processes generally comprise extracting the dilute solution with a suitable solvent and recovering the acid from the solvent layer by distillation. These processes are generally not satisfactory as a large amount of water is taken up in many cases by the solvent during the extraction and ordinary methods of distillation do not suffice to recover the acid in substantially anhydrous form. In order to overcome this difficulty large quantities of solvent must be circulated within the process and the heat requirements for carrying out the process are excessive.

A principal object of this invention is to provide an improved process for the recovery of lower aliphatic acids from aqueous solutions.

Another object of this invention is to provide an improved process for the recovery of anhydrous lower aliphatic acids from dilute aqueous solutions.

Another object of this invention is to provide an improved process for the recovery of anhydrous lower aliphatic acids from aqueous solutions containing from 10% to 50% acid.

A further object of this invention is to provide an improved process for the recovery of anhydrous lower aliphatic acids from aqueous solutions containing more water than can be removed by the solvent when ordinary distillation methods are carried out at atmospheric pressure.

Other objects and advantages of the invention will be apparent from the following description and accompanying drawings in which Figure 1 is a diagrammatic view of the elements of a system which may be used in carrying out an embodiment of the invention.

Figure 2 is a chart of the equilibrium concentrations, at room temperature, of acetic acid in ethyl acetate and water phases and the distribution coefficients.

Figure 3 is a chart of the various water concentrations in an ethyl acetate extract layer in equilibrium with acetic acid concentrations in this layer at room temperature.

Figure 4 is a chart of the equilibrium concentrations, at room temperature, of acetic acid in solvent and water phases and the distribution coefficients where the solvent is ethyl acetate alone or ethyl acetate with various proportions of benzene.

Figure 5 is a chart showing the effect of pressure on the composition of the constant boiling mixture of ethyl acetate and water.

Figure 6 is a chart of the equilibrium concentrations, at room temperature, of acetic acid in solvents and water phases where the solvents are isopropyl ether, propyl acetate and ethyl acetate which shows that;

The average ratio; $\frac{\% \text{ acid in water layer}}{\% \text{ acid in isopropyl ether layer}} = 3.40:1$ The average ratio; $\frac{\% \text{ acid in water layer}}{\% \text{ acid in propyl acetate layer}} = 1.875:1$ The average ratio; $\frac{\% \text{ acid in water layer}}{\% \text{ acid in ethyl acetate layer}} = 1.189:1$ Figure 7 is a diagrammatic view of the elements of a system which may be used in carrying out another embodiment of the invention.

The invention includes processes for recovering anhydrous lower aliphatic acids from aqueous solutions with solvents where there is more water present than can be removed by distilling the aqueous solution with the solvent at atmospheric pressure. The invention is particularly adapted for recovery processes which involve an extraction of the aqueous acid with an immiscible, or partially immiscible, solvent where an appreciable amount of water is taken up by the solvent extract phase (see Figure 3). The invention is also adapted to processes in which no extraction step is included but in which all the water in the aqueous acid is distilled directly as a constant boiling mixture with a water-withdrawing agent, such as the process disclosed in United States Patent 1,917,391.

In carrying out the process with an extracting step, the dilute aqueous solution of lower aliphatic acid is extracted with a substantially water immiscible solvent which has a high acid extraction capacity. A number of solvents may be used including the esters of lower aliphatic acids, such as ethyl acetate, propyl acetate, butyl acetate, either alone or mixtures thereof or admixed with other non-ester solvents such as benzene. (The distribution data for several of these solvents are given in Figures 2, 4 and 6.) The chosen solvent is passed through the aqueous solution at a minimum rate required to extract, at maximum concentration, substantially all of the acid, and at the same time maintain sufficient density differences between aqueous-acid and solvent-extract phases to permit continued and uniform operation. The solvent in extracting a maximum amount of acid also takes up an amount of water which is in excess of that which can be removed by ordinary distillation of the extract layer at atmospheric pressure. I have found that by increasing the pressure at which the extract is distilled, a greater amount of water can be removed in the constant boiling mixture of solvent and water, and that distillation can be carried out at such pressure that the proportions of the water and solvent in the constant boiling mixture correspond to the proportions of water and solvent in the extract layer being distilled and an anhydrous acid may be obtained.

In the process diagrammatically shown in Figure 1 of the drawings, the dilute aqueous acid solution is introduced into the extractor 15 near the top by the pipe 16. A minimum quantity of solvent of the type named above is introduced into the extractor near the bottom by the pipe 17 and flows upwardly and extracts a maximum amount of acid. The solvent is introduced into the extractor at such a rate that the density of the extract layer approaches, but does not exceed that of the aqueous acid solution so that uniform countercurrent flows are maintained. The acid is substantially all removed in the extract layer and the water layer is discharged through the pipe 18 to a storage tank or suitable stripping column where any dissolved solvent may be recovered. The extract layer comprising solvent, acid and water is withdrawn from the top of the extractor and flows through the pipe 3 to the fractionating column 1. The column is provided at the bottom with a steam heating coil 2 and at the top with a reflux coil 4. The distillation is carried out in the column under such pressure that the proportions of water and solvent in the constant boiling mixture of the two leaving the top of the column correspond to the proportions of water and solvent introduced into the column in the extract layer. The distillate is removed from the top of the column through the pipe 5 to the condenser 6. The condensed distillate passes from the condenser through the pipe 7 and the chamber 8 to the decanter 11 where it separates into a solvent layer and a water layer. The pressure in the column is maintained by the pressure control valve 10 in the pipe 9 which is connected to the chamber. The solvent layer is removed from the decanter through the pipe 12 and may be stored or returned to the extractor. The water layer is removed from the decanter through the pipe 13 to a storage tank or to a stripping column where any dissolved solvent may be recovered. The anhydrous acid is removed from the column through the pipe 14. Cooling water is permitted to flow through the reflux coil 4 at a rate just sufficient to condense the relatively small quantity of reflux required to prevent acid from distilling out the top of the column along with the vaporous mixture of water and solvent comprising the constant boiling mixture.

In the process diagrammatically shown in Figure 7 of the drawing the dilute aqueous acid solution is introduced into the extractor 25 near the top by the pipe 26. Acid-free solvent, having a high acid extracting capacity, is introduced into the extractor near the bottom by the pipe 27. The solvent is introduced into the extractor at such a rate that the density of the extract layer approaches, but does not exceed that of the aqueous acid solution. The same solvents may be used and the extractor may be operated in the same manner as in the process diagrammatically shown in Figure 1 and described above. The acid is substantially all removed in the extract layer and the water layer is discharged through the pipe 28 to a storage tank or to a suitable stripping column for recovering any dissolved solvent. The extract layer comprising solvent, acid and water is withdrawn from the extractor by the pipe 29 and introduced into the evaporator 30 which is maintained at superatmospheric pressure. Steam is introduced into the evaporator through a closed coil 58 or other type of indirect heating element. Substantially equilibrium evaporation of a portion of the extract layer occurs and the vaporous mixture passes through the pipe 31 to the condenser 37. Suitable valve means are provided for maintaining the pressure in the evaporator. The condensate, which contains water and solvent in percentage relationship approaching that of the constant boiling mixture at the pressure of operation (see Figure 5), and which also contains a relatively small percentage of acid, passes through the pipe 32 to the decanter 33 where the solvent and water separate into layers. The solvent layer is removed by the pipe 34 and the water layer is removed by the pipe 35. Both of these layers are returned to the extractor 25 by the pipes 59 and 60 for recovery of acid which they contain. Acid concentrations of the two phases within the extractor correspond, at the points of introduction, to the acid concentrations of the two layers. The residual extract layer is withdrawn from the evaporator by the pipe 36 to the solvent recovery column 38. The solvent recovery column is provided at the bottom with the steam heating coil 39. The extract layer is distilled in the solvent recovery column at atmospheric pressure. The constant boiling mixture of solvent and water is removed from the top of the column and flows through the pipe 40 to the condenser 41. The condensate passes from the condenser through the pipe 42 to the decanter 43 where the solvent and water separate into layers. The solvent layer is removed from the decanter by the pipe 44. A portion of the solvent layer is returned to the top of the solvent recovery column by the pipe 45 as reflux. The quantity so returned is just sufficient to prevent acid from distilling over the top of the column. The remainder of the solvent layer, which is acid-free, is withdrawn through the pipe 46 to a storage tank, where it is available for re-use in the extractor 25. The water layer is withdrawn by the pipe 47 to a storage tank or to a stripping column to recover any dissolved solvent. Under these conditions there is not sufficient solvent present to remove all the water from the extract layer. The residual acid and water is withdrawn from the solvent recovery column by the pipe 48 and introduced into the dehydrating column 49 which is provided at the bottom with a steam coil 50. An immiscible non-ester solvent forming a constant boiling mixture with water is introduced into the column. A solvent having a low acid extracting capacity may be used such as isopropyl ether, benzene, chlorinated hydrocarbons and the like. These should preferably form no constant boiling mixture with the acid. The residual acid and water is distilled in the dehydrating column in the presence of the solvent at superatmospheric pressure and all the water is removed in a constant boiling mixture with the solvent. The constant boiling mixture is withdrawn from the column through the pipe 51 to the condenser 52. The condensed solvent and water passes through pipe 53 to the decanter 54 where the solvent and water are separated into layers. The solvent is removed from the decanter through the pipe 55 and is returned to the top of the dehydrating column. The water layer is withdrawn through the pipe 56 or to a stripping column to recover any dissolved solvent. The anhydrous acid is removed from the column by the pipe 57. In carrying out the distillation under pressure in the dehydrating column with a non-ester entrainer of relatively poor extraction efficiency and of the type named, it is found that a minimum heat input is required for the final separation of water from acid.

The invention provides an efficient and economical process for recovering lower aliphatic acids from dilute aqueous solutions. By carrying out the evoporation and final dehydration stages of operation under pressure, larger quantities of water can be removed with a given amount of solvent with a minimum heat expenditure and with equipment considerably smaller in size than would be required were these distillations carried out at substantially atmospheric pressure.

The following examples are illustrative of the invention:

1. An aqueous solution containing 28% acetic acid is extracted at a temperature of 60° F. with ethyl acetate. An extract layer comprising approximately 77.6% ethyl acetate, 11.7% acetic acid and 10.70% water is obtained. The extract layer is distilled in a column at a gauge pressure of 41 pounds per square inch. The water and solvent are distilled off as a constant boiling mixture in which the proportions of ethyl acetate and water correspond to the proportions of ethyl acetate and water in the extract layer. Practically anhydrous acetic acid is recovered from the base of the column.

2. An aqueous solution containing 28% acetic acid is extracted at a temperature of 68° F. with ethyl acetate. An extract layer containing approximately 75% ethyl acetate, 13% acetic acid and 12% water is obtained. The extract layer is evaporated at a gauge pressure of 100 pounds per square inch and approximately 35% of the water in the extract layer is removed in substantially a constant boiling mixture of water and ethyl acetate. The residual mixture of ethyl acetate, acetic acid and water is distilled at atmospheric pressure in a column and the ethyl acetate is removed in a constant boiling mixture of ethyl acetate and water. There is not sufficient solvent present to remove all the water and a residual solution of approximately 85% acetic acid and 15% water is removed from the bottom of the column. The residual solution of acetic acid and water is distilled in a column at a gauge pressure of 30 pounds per square inch in the presence of sufficient isopropyl ether to remove all the water in a constant boiling mixture of water and isopropyl ether. A practically anhydrous acetic acid of 99.9% acid concentration is removed from the bottom of the column.

While a preferred embodiment of the invention has been shown, it is to be understood that changes and variations may be made without departing from the spirit and scope of the invention as defined by the appended claims.

What I claim is:

1. A process for recovering lower aliphatic acids from aqueous solutions comprising extracting the acid from the solution with an ester of a lower aliphatic acid whereby a greater quantity of water is taken up in the extract layer relative to the ester therein than corresponds to the proportion thereof in the constant boiling mixture of water and ester at atmospheric pressure and distilling the extract layer at superatmospheric pressure to remove the water in the extract layer in a constant boiling mixture with the ester of a lower aliphatic acid, in which the proportions of water and ester substantially correspond to the proportions of water and ester in the extract layer.

2. A process for recovering lower aliphatic acids from aqueous solutions thereof comprising extracting the acid from the solution with an ester of a lower aliphatic acid whereby a greater quantity of water is taken up in the extract layer relative to the ester therein than corresponds to the proportion thereof in the constant boiling mixture of water and ester at atmospheric pressure, and removing water from the extract layer by a procedure comprising the step of distilling an azeotropic mixture thereof at superatmospheric pressure.

3. A process for recovering acetic acid from dilute aqueous solutions thereof comprising extracting the acid from the solution with an ester of a lower aliphatic acid whereby a greater quantity of water is taken up in the extract layer relative to the ester therein than corresponds to the proportion thereof in the constant boiling mixture of water and ester at atmospheric pressure, and removing water from the extract layer by a procedure comprising the step of distilling an azeotropic mixture thereof at superatmospheric pressure.

4. A process for recovering acetic acid from dilute aqueous solutions thereof comprising extracting the acid from the solution with ethyl acetate whereby a greater quantity of water is taken up in the extract layer relative to the ester therein than corresponds to the proportion thereof in the constant boiling mixture of water and ester at atmospheric pressure, and removing water from the extract layer by a procedure comprising the step of distilling an azeotropic mixture thereof at superatmospheric pressure.

THEODORE O. WENTWORTH.